Sept. 2, 1930. F. M. BODOH 1,774,697
DIRIGIBLE SPOTLIGHT FOR AUTOMOBILES
Filed May 12, 1928 3 Sheets-Sheet 1
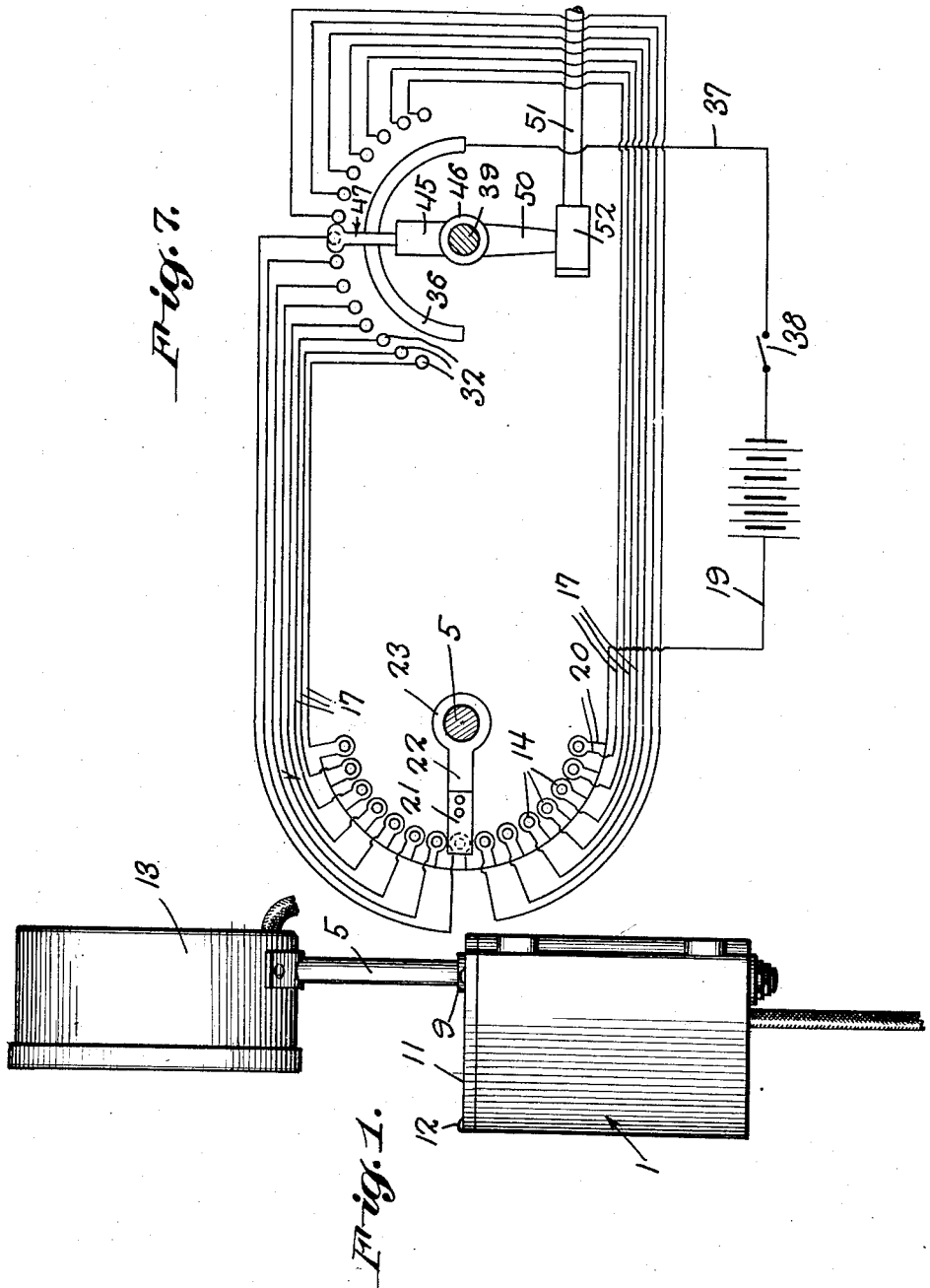
Francis M. Bodoh, INVENTOR.
ATTORNEYS.

Sept. 2, 1930.  F. M. BODOH  1,774,697
DIRIGIBLE SPOTLIGHT FOR AUTOMOBILES
Filed May 12, 1928  3 Sheets-Sheet 2
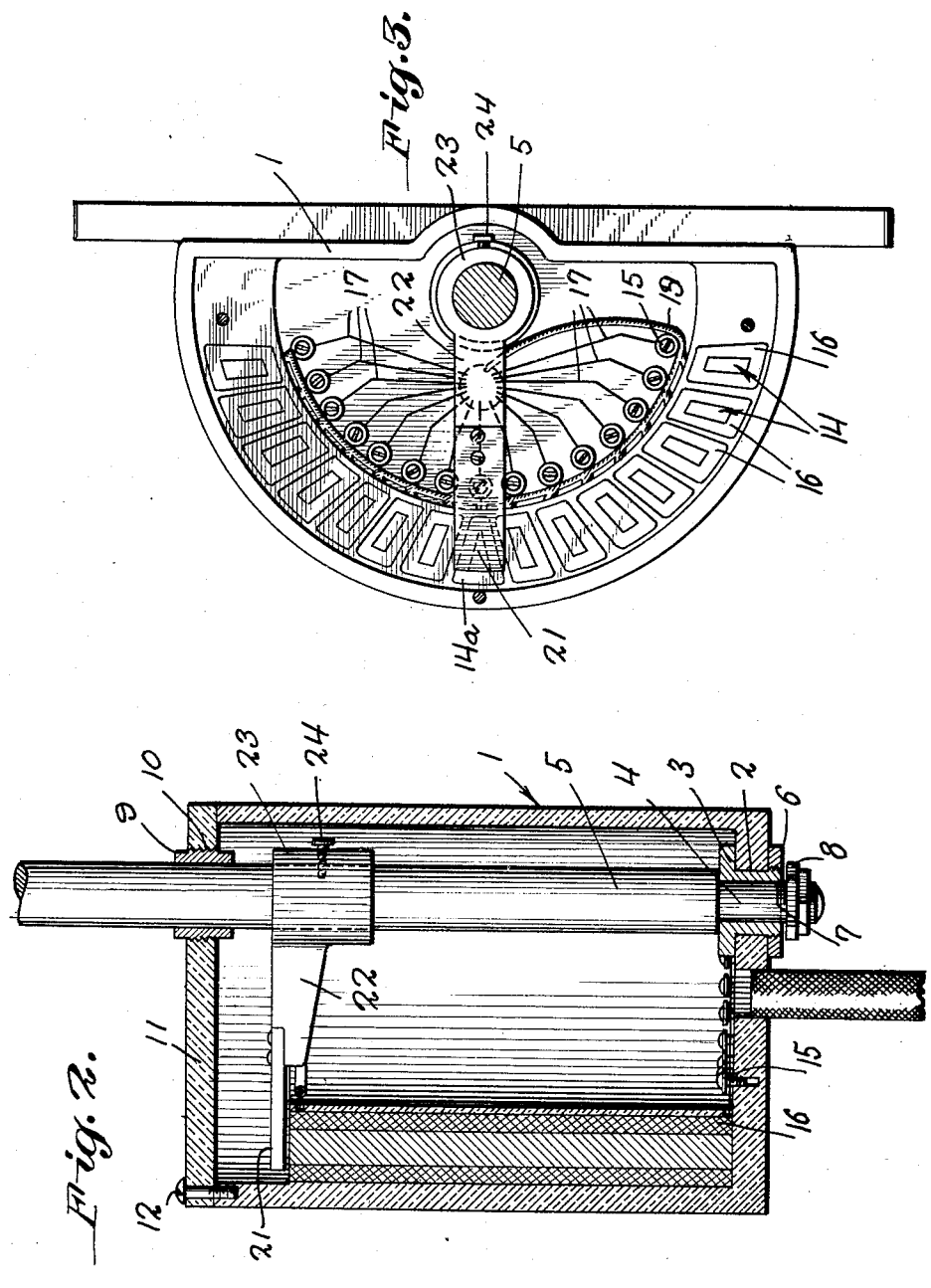
Francis M. Bodoh, INVENTOR.

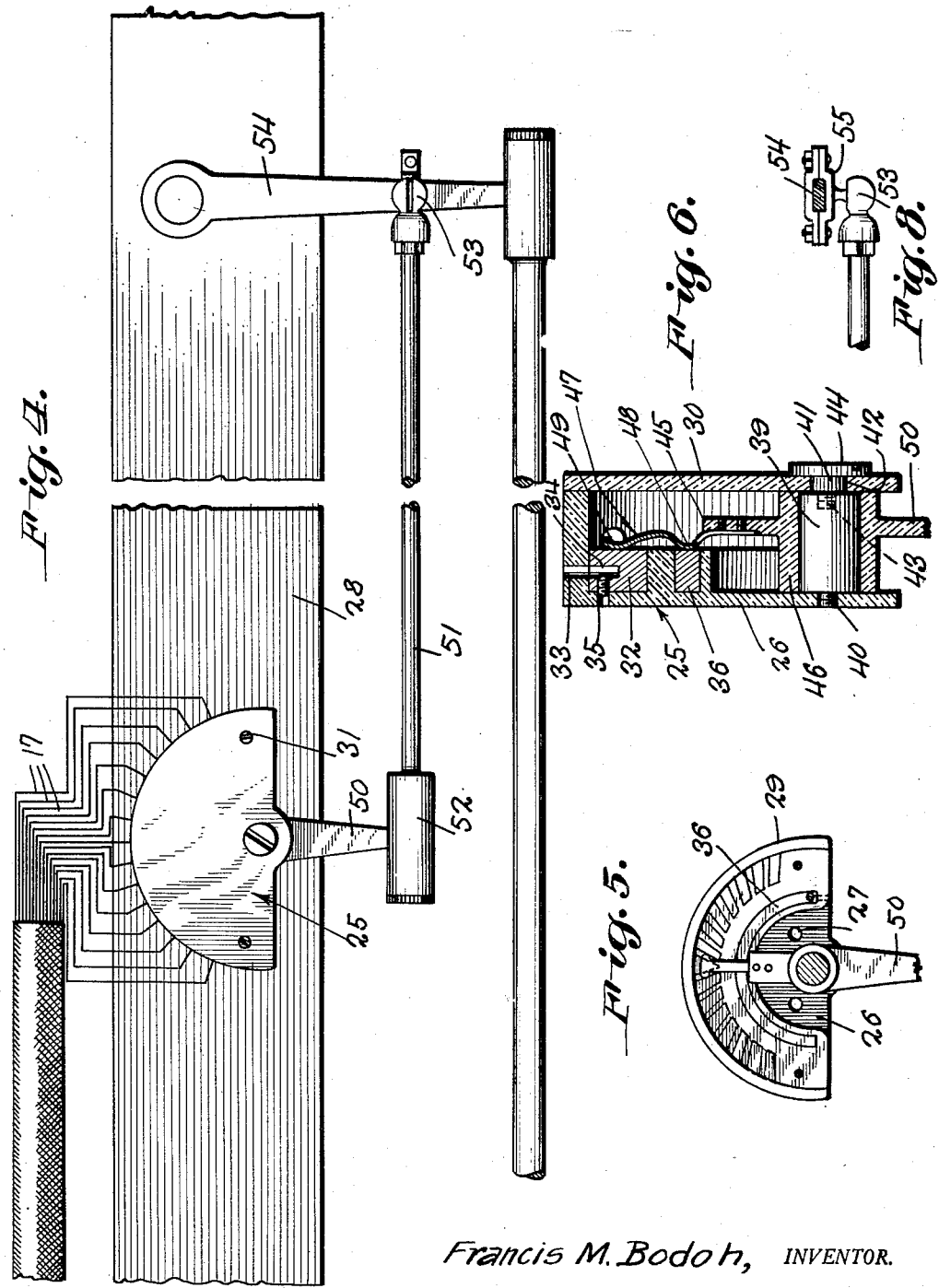

Patented Sept. 2, 1930

1,774,697

UNITED STATES PATENT OFFICE

FRANCIS M. BODOH, OF KEWAUNEE, WISCONSIN

DIRIGIBLE SPOTLIGHT FOR AUTOMOBILES

Application filed May 12, 1928. Serial No. 277,163.

This invention relates to improvements in dirigible spotlights for automobiles and has as its general object to overcome the disadvantages of one type of spotlights of this class and obtain new advantages not present in previously constructed spotlights of the dirigible type.

Dirigible spotlights as ordinarily constructed embody a mechanical connection between their stems and some portion of the steering mechanism of the automobile upon which they are installed, but dirigible spotlights of this type present the disadvantage that the spotlight is subjected to vibration through the connection between it and the steering mechanism, even where care is exercised to maintain the joints and connections tight. Therefore the present invention has as one of its objects to provide a dirigible spotlight which may be readily installed upon an automobile at any convenient point and which will be automatically operated through an electrically controlled means, in consonance with rotation of the steering wheel of the automobile, the invention contemplating the elimination of mechanical connections between the steering apparatus and the spotlight and therefore obviating vibration of the spotlight and provide for the more steady and accurate direction of light rays from the spotlight onto the road surface directly in the line of travel of the automobile.

Another object of the invention is to provide a dirigible spotlight which will be entirely automatic in its operation and which will be exceptionally simple and durable in its construction and adapted to be installed, without any difficulty, upon any make or type of automobile, and without the necessity of in any way altering the construction of any of the standard parts of the automobile.

While the accompanying drawings and the description which is to follow, constitute a disclosure of the preferred embodiment of the invention, it will be understood that various changes may be made within the scope of what is claimed.

In the accompanying drawings:

Figure 1 is a view in side elevation of the spotlight and that portion of the apparatus which is provided for controlling the same and which portion is directly associated with the spotlight;

Figure 2 is a vertical front to rear sectional view in detail through the portion of the apparatus shown in Figure 1, the spotlight supporting stem being broken away;

Figure 3 is a plan view of the portion of the apparatus shown in Figure 2, the cover for the casing being removed;

Figure 4 is a view in elevation of that portion of the apparatus which is associated with the steering gear of the automobile;

Figure 5 is a view in elevation of the automatic circuit closer of the apparatus shown in Figure 4, the cover for the casing thereof being removed;

Figure 6 is a vertical front to rear sectional view through the structure shown in Figure 5;

Figure 7 is a diagrammatic view illustrating the electric circuits;

Figure 8 is a horizontal sectional view on the line 8—8 of Figure 4.

Generally speaking the spotlight apparatus embodying the invention includes a support for the spotlight, an electromagnetic means for rotatably adjusting the support, and a circuit closing device controlled by the operation of the steering mechanism of the automobile for controlling the supply of current to the electromagnetic actuating means in consonance with the operation of the steering mechanism.

The electromagnetic means for imparting rotary movement to the spotlight to adjust the same in consonance with operation of the steering mechanism of the automobile, is mounted in a casing 1 which is preferably of insulating material and provided with any suitable means or constructed in any suitable manner to adapt it to be mounted upon any convenient part of the automobile, at or near the front of the automobile body and this casing is provided in its bottom with an opening 2 in which is arranged a bearing bushing 3 rotatably accommodating the reduced lower end 4 of the spotlight supporting stem which is indicated by the numeral 5, a nut 6 being threaded onto the lower end of the bushing to bind against the under side of the bottom of the casing and thus hold the bushing in place, and the said reduced end 4 of the stem 5 being threaded as indicated by the numeral 7 for the application thereto of nuts 8 which prevent unseating of the end 4 of the spotlight stem 5 from the bushing. The stem 5 is mounted near the rear wall of the casing 1, which casing is preferably of substantially the semi-cylindrical form shown in Figure 3, and extends upwardly through a bushing 9 which is mounted in an opening 10 provided in the removable top 11 of the casing which top may be held in place by screws or other suitable fastening elements indicated by the numeral 12. The spotlight is indicated by the numeral 13 and, as shown in Figure 1 of the drawings, is mounted at the upper end of the stem 5.

The electromagnetic means for effecting automatic rotation of the stem 5 to suitably angularly adjust the spotlight 13 comprises a series of electromagnets indicated in general by the numeral 14, the magnets being arranged in a substantially semi-annular series within the casing 1 and along the inner side of the circumferential or arcuate wall of said casing as best shown in Figure 3 of the drawings. The electromagnets 14 are vertically disposed and equi-distantly spaced and one of said magnets, indicated specifically by the numeral 14ª is, for a purpose to be presently explained, located directly in advance of the stem 5 and midway of the ends of the series of magnets, it being observed by reference to Figure 3 that the arrangement of the magnets is such that the series is concentric to the axis of the said stem 5. Through the medium of the automatic circuit closing device heretofore referred to, current is to be supplied to the electromagnets 14 successively and independently in a manner which will presently be set forth, and for this purpose a series of binding posts 15 is arranged upon the bottom of the casing 1, each of the binding posts being located directly inwardly of a respective one of the electromagnets 14, and the coil 16 of each magnet being connected by a short extension of its winding with the respective one of the binding posts 15. Conductor wires 17 are led from the binding posts 15 and to the circuit closing device as illustrated in Figure 7 and as will presently be more fully explained. Preferably use will be made of the battery of the automobile as a source of current supply for the apparatus of the invention and this battery is indicated in the drawings by the numeral 18 and a conductor wire 19 is led from the negative binding post of the battery and has branches 20 connected with the other terminals of the coils of the electromagnets 14.

As before stated, the electromagnets 14 are arranged vertically and the upper ends of their cores therefore occupy a common horizontal plane. At this point it may be stated that the circuit closing device, as will presently be more fully described, is constructed to operate automatically, upon operation of the steering mechanism of the automobile, to close the circuits through the magnets 14 successively in the direction of one end or the other of the series of magnets, depending upon the direction in which the automobile is steered, and in order that successive energization of the magnets may result in an angular adjustment of the spotlight supporting stem 5, an armature, which is indicated by the numeral 21 and which preferably comprises a soft iron plate, is rigidly supported at the outer end of an arm 22 which extends radially from a collar 23 which is fitted upon the stem 5, within the casing 1, and secured in place by a set screw 24, the armature 21 being in this manner supported in such position, as illustrated in Figures 2 and 3 of the drawings, that it will occupy a horizontal plane immediately above the plane occupied by the upper ends of the cores of the electromagnets 14 and will be movable in close proximity to these ends of the cores, throughout the entire series, it being evident at this point that when the electromagnet 14ª is energized, the armature 21 will be attracted to its core and at such time the stem 5 will be held stationary in position to support the spotlight 13 in a directly forwardly presented position so that the light rays from the spotlight will be directed onto the road surface directly in advance of the automobile upon which the apparatus of the invention is installed. It will likewise be understood at this point that if the electromagnets 14 are energized successively in order ranging from the electromagnet 14ª toward one end or the other of the series of magnets, the armature 21 will be attracted to the cores of the energized ones of the magnets thus resulting in rotative adjustment of the stem 5.

The circuit closing device, heretofore referred to, is best illustrated in Figures 4, 5 and 6 of the drawings and is indicated in general by the numeral 25, and this device comprises a casing which is of insulating material and includes a rear wall 26 having openings 27 in a portion thereof, whereby it may be bolted or otherwise secured to the left chassis side frame bar of the automobile which is indicated by the numeral 28, the said casing being preferably of the semi-circular form shown in Figures 4 and 5 and further including a wall 29 which extends about the arcuate periphery of the wall 26, a closure plate 30 being disposed against the open front of the casing and removably secured in place by screws or other suitable fastening elements 31. As will be observed by reference to Figures 5 and 6, the rear wall 26 of the casing is of considerable thickness except at its intermediate and lower portions where it is formed with a substantially semi-circular recess. A semi-annular series of contacts 32 are embedded or molded in the said inner wall 26 of the casing close to the wall 29 thereof, and the wall 29 is formed with a series of openings 33 which register with openings 34 formed in the outer ends of the contacts 32 and the conductor wires 17, heretofore referred to, are embodied in a cable which leads through an opening in the bottom of the casing 1 of the first described unit of the invention and these wires are led through the openings 33 and into the sockets 34 in the contacts 32, each wire being led to a respective one of said contacts and secured in place by a set screw 35 as shown in Figure 6.

By reference, at this point, to Figure 7, it will be observed that each of the conductor wires 17 connects corresponding ones of the binding posts 15 and contacts 32, so that each contact 32 is in circuit with the coil of a respective one of the electromagnets 14, and as the arrangement of the magnets and the contacts 32 is identical, it will be evident that the arrangement is a symmetrical one.

The circuit closing device further includes a semi-annular contact 36 which is embedded in the thicker portion of the rear wall 26 of the casing of the device and which extends concentric with respect to the series of contacts 32, and a conductor wire 37 is connected to one end of this contact 36 and is led to the positive binding post of the battery 18, a manually operable switch 38 being preferably interposed in the length of the wire 37 and located in a position where it may be readily actuated by the driver of the automobile for the purpose of rendering the apparatus inactive during daylight hours and thus economizing in the consumption of current. The numeral 39 indicates a pivot pin which is provided with a reduced threaded end 40 fitted into an opening in the rear wall 26 of the casing, and this pivot pin extends between the said rear wall 26 and the front wall or closure 30, a screw 41 being fitted through an opening 42 in the said front wall 30 and having a reduced threaded end 43 which is threaded into the forward end of the said pin 39, the head 44 of the screw bearing against the outer face of the said front wall 30 and the pivot pin 39 being in this manner firmly supported between the rear wall 26 of the casing and the front wall 30 and the said screw 41 serving likewise to assist in holding the front wall 30 in place. A short arm 45 radiates from a sleeve 46 which is rotatably mounted upon the pivot pin 39, and a contact finger 47 is secured at one end to the said arm 45 and has a bend 48 which permanently contacts the contact member 36, through the resiliency of the said finger 47, the free end of the finger, indicated by the numeral 49 being, in a similar manner, maintained in position to engage the contacts 32.

In order that rotary motion may be imparted to the sleeve 46 to effect swinging or angular movement of the contact 47 and a bridging of the contacts 32 and 36 which are at any time simultaneously engaged by the outer end 49 and bend 48 of the contact finger, and in consonance to the operation of the steering mechanism, the sleeve 46 is provided with an arm 50 extending radially downwardly therefrom opposite the arm 45, and a connecting rod 51 is connected, by a ball and socket joint 52, to the lower end of this arm. The rod 52 extends substantially parallel to the chassis frame member 28 and is connected at its other end, by a ball and socket joint 53, to the steering arm 54 of the steering mechanism of the automobile, the ball and socket joint 53 having one of its members connected with the rod 51 and its other member supported by a clamp 55 which is fitted to the arm 54 and which may be adjusted vertically upon the said arm in order to effect a proper angular movement of the arm 50 in accordance with the angular movement of the steering arm 54 of the steering mechanism of the automobile.

From the foregoing description and from the drawings it will be evident that when the steering mechanism is in such position of adjustment that the front wheels are directed forwardly for travel in a corresponding direction, the arm 45 of the sleeve 46 will be in a vertical position and therefore the contact finger 47 will have its bend 48 in engagement with the contact member 36 at a point midway between the ends thereof, and will also have its end 49 resting in engagement with that one of the contacts 32 which is located at the middle of the series. At this time the circuit will be closed through the electromagnet $14^a$ of the series 14 and the armature 21, being attracted to the core of this magnet, the spotlight 13 will be positioned to direct light rays directly forwardly. Upon rotation of the steering wheel of the steering mechanism toward the right, for example, the steering arm 54 will be swung in a manner to longitudinally displace the connecting rod 51 and swing the arm 50 to the left in Figure 4 whereupon the contact finger 47 will be correspondingly swung to the right and will engage successive ones of the contacts 32, the extent to which the finger 47 is swung to the right being in consonance with the adjustment of the front wheels of the automobile. As the contact finger 47 rides over the contact 36 and over successive ones of the contacts 32, the circuit will be successively closed through the electromagnets 14 which extend toward the right and from the intermediate electromagnet $14^a$ and as these magnets are successively energized, the armature 21 will be successively attracted to the cores of the magnets and therefore the stem 5 which supports the spotlight will be correspondingly rotated so as to rotatably adjust the spotlight and, in this manner effect the automatic direction of light rays from the spotlight onto the road surface directly in the path of travel of the automobile.

Having thus described the invention, what I claim is:

A dirigible head light for motor vehicles comprising a stationary casing, a vertical stem having its lower portion arranged within the casing, bearing elements for the stem carried by the top and bottom walls of the casing, a lamp carried by the upper end of the stem, an arcuate series of stationary electro-magnets arranged within the casing in concentric relation to the stem, the magnets being vertically disposed and having corresponding ends spaced from one of said walls of the casing, a horizontal arm secured to and projecting radially from the stem within the casing, an armature carried by the outer end of the arm and movable across said ends of the magnets, circuit closing means in circuit with the magnets and with a source of current supply and adapted to permit a selected magnet to be energized to effect the angular adjustment of the lamp, said circuit closing means including a plurality of arcuately arranged contacts, one for each magnet and a swinging circuit closing lever for movement over the contacts, and means for swinging the lever from a movable part of the steering mechanism of the vehicle.

In testimony whereof I affix my signature.

FRANCIS M. BODOH.